United States Patent
Naik

(10) Patent No.: US 8,707,027 B1
(45) Date of Patent: Apr. 22, 2014

(54) AUTOMATIC CONFIGURATION AND PROVISIONING OF SSL SERVER CERTIFICATES

(75) Inventor: Alok Naik, Bangalore (IN)

(73) Assignee: Symantec Corporation, Mountain View, CA (US)

( * ) Notice: Subject to any disclaimer, the term of this patent is extended or adjusted under 35 U.S.C. 154(b) by 0 days.

(21) Appl. No.: 13/539,867

(22) Filed: Jul. 2, 2012

(51) Int. Cl.
*H04L 29/06* (2006.01)
(52) U.S. Cl.
USPC ............ 713/156; 713/155; 713/175; 380/258
(58) Field of Classification Search
USPC ............................ 713/156, 155, 175; 380/258
See application file for complete search history.

(56) References Cited

U.S. PATENT DOCUMENTS

| 2005/0091169 A1* | 4/2005 | Peinado et al. | 705/59 |
| 2006/0130144 A1* | 6/2006 | Wernicke | 726/24 |
| 2010/0111300 A1* | 5/2010 | Kido et al. | 380/46 |

* cited by examiner

*Primary Examiner* — Kambiz Zand
*Assistant Examiner* — Ayoub Alata
(74) *Attorney, Agent, or Firm* — Lowenstein Sandler LLP

(57) ABSTRACT

A method and apparatus for automatically configuring and provisioning cryptographic certificates is described. A certificate management sensor receives instructions from a first computing device to analyze a second computing device to identify an application on the second computing device associated with cryptographic network traffic on the second computing device, generates an application fingerprint based on application characteristics of the application, transmits the application fingerprint and a certificate signing request (CSR) to a certificate management system (CMS), and receives second instructions from the CMS to automatically install a cryptographic certificate on the second computing device based on the application fingerprint and CSR.

17 Claims, 6 Drawing Sheets

US 8,707,027 B1

AUTOMATIC CONFIGURATION AND PROVISIONING OF SSL SERVER CERTIFICATES

TECHNICAL FIELD

Embodiments of the invention relate to the field of processing data, and more particularly, to automatic configuration and provisioning of SSL server certificates.

BACKGROUND OF THE INVENTION

The deployment and adoption of cloud, virtualization, mobile, and social media applications in recent years have increased demand for SSL certificates. As SSL certificates are deployed to secure transactions through these different trends, the management of SSL certificates becomes more challenging. With network infrastructures that spans multiple groups of servers, organization units, and locations, managing SSL certificates can be a complex, time-consuming process that burdens information technology (IT) teams and puts a drain on resources.

Currently a network administrator configures and provisions SSL certificates manually or through simple scripts. Network administrators generally need to login to each server (which could number in the thousands) to obtain and install new or renewed SSL certificates. Installing a new or renewed SSL certificate can be a tedious and time consuming task that is prone to mistakes.

The consequences of mismanagement of certificates can be dire. Any uncertainty surrounding SSL certificates status poses a risk that can have serious consequences. For example, the expiration of an unknown certificate, a missed renewal, or update—or keeping an expired certificates on an asset—can create security vulnerabilities, leaving enterprise networks exposed and potentially resulting in critical system downtime. If a data security breach occurs, the costs of mitigating the damage can be expensive: enterprises can face higher support costs, lower productivity and revenue, and even cause damage to their hard-earned reputations.

SUMMARY OF THE INVENTION

A method and apparatus for automatically configuring and provisioning cryptographic certificates is described. In one embodiment, the method includes receiving instructions to analyze a computing device to identify an application associated with cryptographic network traffic, and generating, by a processor, an application fingerprint based on application characteristics. The method also includes transmitting the application fingerprint and a certificate signing request (CSR) to a certificate management system (CMS), and receiving instructions from the CMS to automatically install a cryptographic certificate based on the application fingerprint and CSR.

In one embodiment, the set of cryptographic certificates comprises at least one of Secure Socket Layer (SSL) server certificates or Transport Layer Security (TLS) server certificates. The method may also include installing the cryptographic certificate according to the instructions, and instructing an agent operating on a computing device to install the cryptographic certificate according to the instructions.

The application characteristics may comprise a checksum of a file corresponding to the application, a size of the file, and a byte pattern for the file. The byte pattern, in on embodiment comprises a fixed number of bytes extracted from the file at one of the first 1 kB, the last 1 kB, or the middle 1 kB of the file.

In one embodiment, the instructions to analyze the computing device further comprise instructions to identify the configuration of the computing device, the configuration comprising at least one of the operating system, the IP address, port used by the cryptographic network traffic, cryptographic certificate expiration date, a signature algorithm information, key length information, or certificate issuer information.

In addition, a computer readable storage medium for automatically configuring and provisioning is described. An exemplary computer readable storage medium provides instructions, which when executed on a processing system causes the processing system to perform a method such as the exemplary methods discussed above.

Further, systems and apparatus of certificate management sensor are described. An exemplary apparatus may include a memory and a processor coupled to the memory. The processor is configured to execute the certificate management sensor to perform various operations, such as those described above.

BRIEF DESCRIPTION OF THE DRAWINGS

The present invention will be understood more fully from the detailed description given below and from the accompanying drawings of various embodiments of the invention, which, however, should not be taken to limit the invention to the specific embodiments, but are for explanation and understanding only.

DETAILED DESCRIPTION OF THE PRESENT INVENTION

A method and apparatus for automatically configuring and provisioning cryptographic certificates is described. A certificate management sensor receives instructions from a first computing device to analyze a second computing device to identify an application on the second computing device associated with cryptographic network traffic on the second computing device, generates an application fingerprint based on application characteristics of the application, transmits the application fingerprint and a certificate signing request (CSR) to a certificate management system (CMS), and receives second instructions from the CMS to automatically install a cryptographic certificate on the second computing device based on the application fingerprint and CSR.

Figure 1:
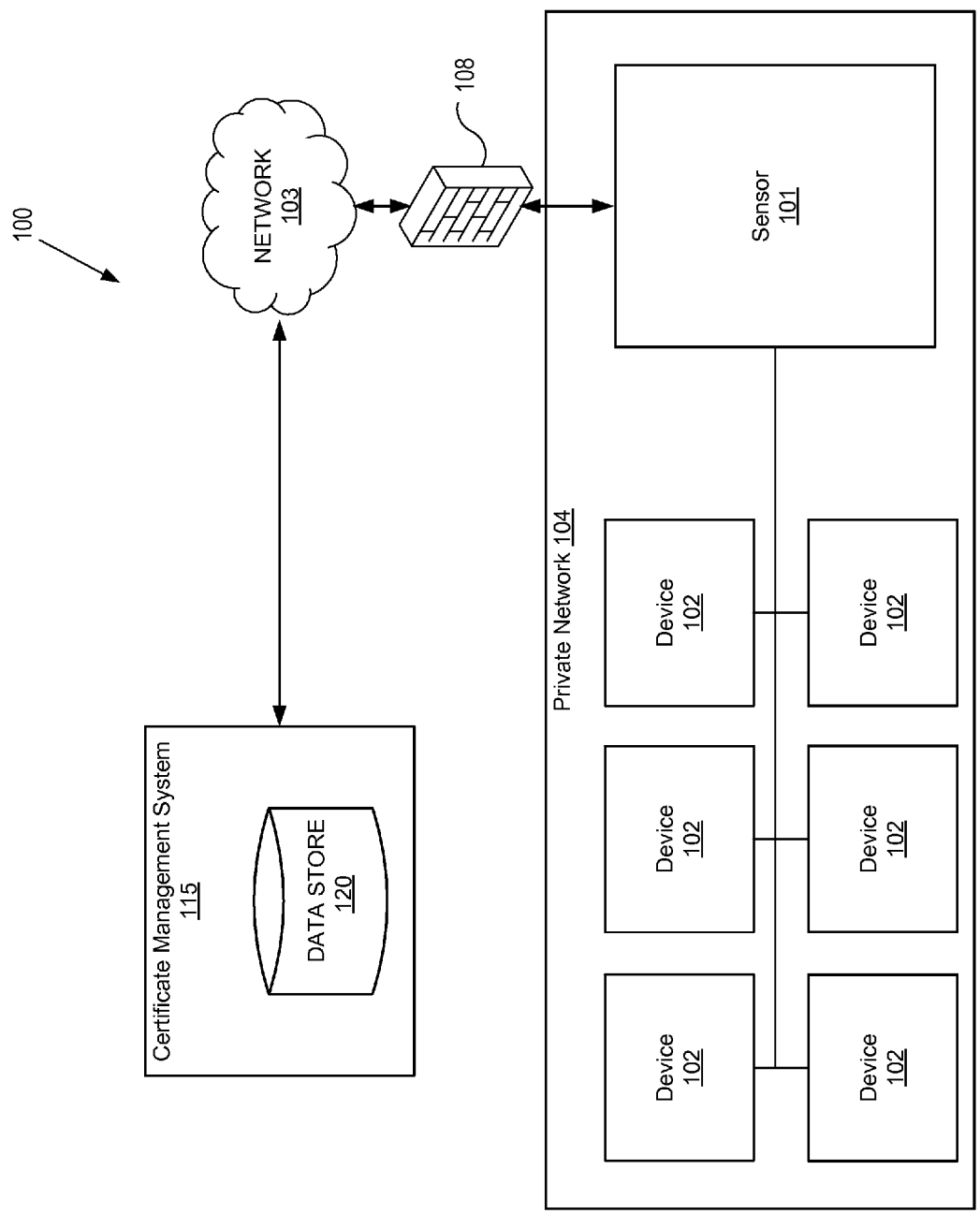
FIG. 1 is a block diagram of an exemplary network architecture in which embodiments of a certificate management sensor may operate.

FIG. 1 is a block diagram of an exemplary network architecture 100 in which embodiments of a certificate management sensor (hereinafter "sensor") 101 may operate. The network architecture 100 may include multiple computing systems 102 coupled via a network 103 (e.g., public network such as the Internet or private network such as a local area network (LAN)). The computing systems 102 may include personal computers, laptops, personal digital assistants (PDAs), mobile phones, network appliances, a gateway, server computer, etc. The computing systems 102 may reside on the same LAN 104, or on different LANs that may be coupled via the Internet, but separated by firewalls, routers, and/or other network devices. In another embodiment, the computing systems 102 may reside on different networks.

The computing systems 102 store one or more deployed cryptographic certificates. The deployed certificates may be SSL sever certificates, TLS server certificates, or other types of cryptographic certificates. Although the depicted embodiment illustrates six computing systems 102, the deployed certificates may be deployed in more than six computing systems 102. For example, the deployed certificates may be deployed in hundreds and even thousands of computing systems in a network.

In one embodiment, the sensor 101 is implemented as part of a certificate management system (CMS) 115 that can provide a view of SSL security across the enterprise, allowing administrators to take control of all SSL certificates issued by any Certificate Authority. In one embodiment, the sensor 101 can scan and centralize information about the SSL certificates installed on the computing devices 102 into a central repository 120. The sensor 101 is configured to detect, identify, and transmit the information over the network 103 to the CMS 115. The CMS 115 may give administrators detailed intelligence they need to manage the enterprise SSL environment quickly and easily. For example, an enterprise with more than 100 servers under management can use the CMS 115 to automate certificate discovery tasks and set up alerts to notify administrators when certificates expire or require maintenance. With the CMS 115, automated and configurable discovery scans can be performed to reduce the time taken to keep track of SSL certificate assets.

The CMS 115 may include a console and multiple sensors 101. Although depicted herein as a single sensor 101, multiple sensors 101 may be installed at strategic points in the network and perform actions based on instructions assigned by an administrator using the console. Together, these tools can provide a mechanism to audit and manage the SSL certificates across the network. The CMS 115 may include customizable SSL certificate discovery feature that can be used to schedule and configure how scans are performed across different parts of the network, while taking advantage of sensors 101 that can scale to thousands of servers.

The sensor 101, in one embodiment, is installed between a cluster of computing devices 102 and the network 103. Typically, a private network 104 includes a firewall 108 or other network traffic monitoring device that blocks inbound requests from the network 103. However, the firewall of the private network 104 will allow outbound requests from the computing devices 102. As such, the sensor 101 may be installed on the same side of the firewall 108 as the computing devices 102 to enable access to the computing devices 102 without being blocked by the firewall 108. In one embodiment, the sensor 101 communicates over the network 103 with the CMS 115 and retrieves instructions from the CMS 115. Consequently, the position of the sensor 101 inside of the firewall 108 enables the CMS 115 to direct the administration of the SSL certificates without any special configuration of the firewall 108. An administrator may access a user interface provided by the CMS 115 to review the status of SSL certificates within the private network 104.

The CMS 115 may include a gorgeous, instinctual user interface, such as with a dashboard for easy-to-use reporting capabilities and providing access to certificate information. The CMS 115 may use analytical tools to act on discovered data to provide information such as Online Certificate Status Protocol (OCSP) responses, Certificate Revocation List (CRL) responses, forecasting calculations, ratings, or the like. The CMS 115 may also include in-console alerts and email notifications to inform users of pending certificate expiration and other certificate lifecycle status to provide relevant and timely information to administrators. The CMS 115 may also be used to delegate task to appropriate individuals to handle the tasks. The CMS 115 can also be used for audit trails by creating logs that record actions taken by administrators, logs that record key events associated with the sensors, or the like.

In one embodiment, the CMS 115 is used to collect information about the deployed certificates, via the sensor 101, and stores the deployed certificate information in a local data store 120. In the depicted embodiment, the local data store 120 is local to the CMS 115. In another embodiment, the deployed certificate information can be stored in a remote data store. The local data store 120 and the remote data store 170 may be data stores of one or more data repositories that represent a single or multiple data structures (databases, repositories, files, etc.) residing on one or more mass storage devices, such as magnetic or optical storage based disks, tapes or hard drives.

Although only one CMS 115 is illustrated in FIG. 1, the CMS 115 may be hosted on one or more machines, including one or more server computers, client computers, gateways or other computing devices. In yet another configuration, the CMS 115 may reside on a single server or on different servers, coupled to other devices via a public network (e.g., the Internet) or a private network (e.g., LAN). In one embodiment, a service provider hosts the CMS 115. The hosted service provider may also have multiple instances of the CMS 115 on multiple networks that communicate with the service provider over a public or private network. It should be noted that various other network configurations can be used including, for example, hosted configurations, distributed configurations, centralized configurations, etc.

The CMS 115, via the user-interface console, is configured to receive remote login credentials for the computing devices 102. The CMS 115 communicates the remote login credentials with the sensor 101. The sensor 101 is configured to scan the private network 104 and determine which of the computing devices 102 have a cryptographic certificate. In one embodiment, the sensor 101 performs a scan on ports typically used for cryptographic transmissions (e.g., port 443). Alternatively, the sensor 101 performs a scan based on input received from an administrator, via the CMS 115 console. The sensor 101 is configured to collect computing device 102 information related to discovered certificates that include, but is not limited to, IP, port, certificate chain, etc.

The sensor 101 is also configured to determine, in response to an instruction from the CMS 115, an application identity of the specific applications using the certificates operating on the computing devices 102. For example, the sensor 101 determines the type of webserver operating on each computing device 102. The application identity, in one embodiment, includes an application name, application version, and operating system identifier. The CMS 115 determines the application identity by receiving an application fingerprint from the sensor 101, and comparing the application fingerprint with a database of applications stored in the data store 120. The sensor 101, in generating an application fingerprint, determines a checksum (e.g., hash) of a file on disk that corresponds to the process associated with securing communications using the certificate, a size of the file, and a byte pattern from the file. The sensor 101 is configured to transmit the application fingerprint to the CMS 115 in response to an instruction from the CMS 115 to identify applications.

The sensor 101 may be configured to determine the application by running a command via a remote interface (e.g., SSH) using the remote login credentials. For example, the sensor 101 may issue, to a computing device 102 running Linux, the command "netstat+ps." Similarly, the sensor 101 may determine the checksum hash, size of file, and byte pattern using commands known to those of skill in the art.

In one embodiment, the byte pattern may be a fixed number of bytes taken from pre-determined locations in the file. For example, the sensor 101 may extract the first 1 kB, the last 1 kB and 1 kB from the exact middle of the file. If the file is less than 3 kB, for example, the sensor 101 is configured to take the entire file and pad the rest of the pattern with zeroes to maintain consistency in the length of the byte patterns stored in the data store 120.

The CMS 115 may initialize the data store 120 with information from every computing device 102 in the private network 104. This information, in one embodiment, includes the number and type of computing devices 102, the certificates on each of the computing devices 102, and expiration dates of each of those certificates. The CMS 115 maintains this information until such time that an administrator initiates a certificate renewal process, or a new certificate installation process. In a further embodiment, the CMS 115 notifies the administrator of renewal dates for certificates. In another embodiment, the CMS 115 automatically renews expiring certificates without receiving input from an administrator.

When a certificate needs to be renew, or when an administrator initiates a new certificate install, the CMS 115 generates, based upon the application identity of a target computing device 102, instructions for either generating a certificate signing request (CSR), and installing a new certificate or renewing or replacing an existing certificate. For example, after identifying that an application fingerprint identifies that a computing device 102 is running a specific version of Internet Information Server (IIS) by Windows, the CMS 115 generates instructions for IIS and transmits the instructions to the sensor 101. The sensor 101 is configured to generate the CSR based on the instructions and transmit the CSR to the CMS 115. The CMS 115 receives the CSR and transmits installation or renewal instructions, together with the renewed or new certificate to the sensor 101. The sensor 101 accesses the target computing device 102, via a remote session, and executes the instructions for installing the renewed or new certificate.

Figure 2:
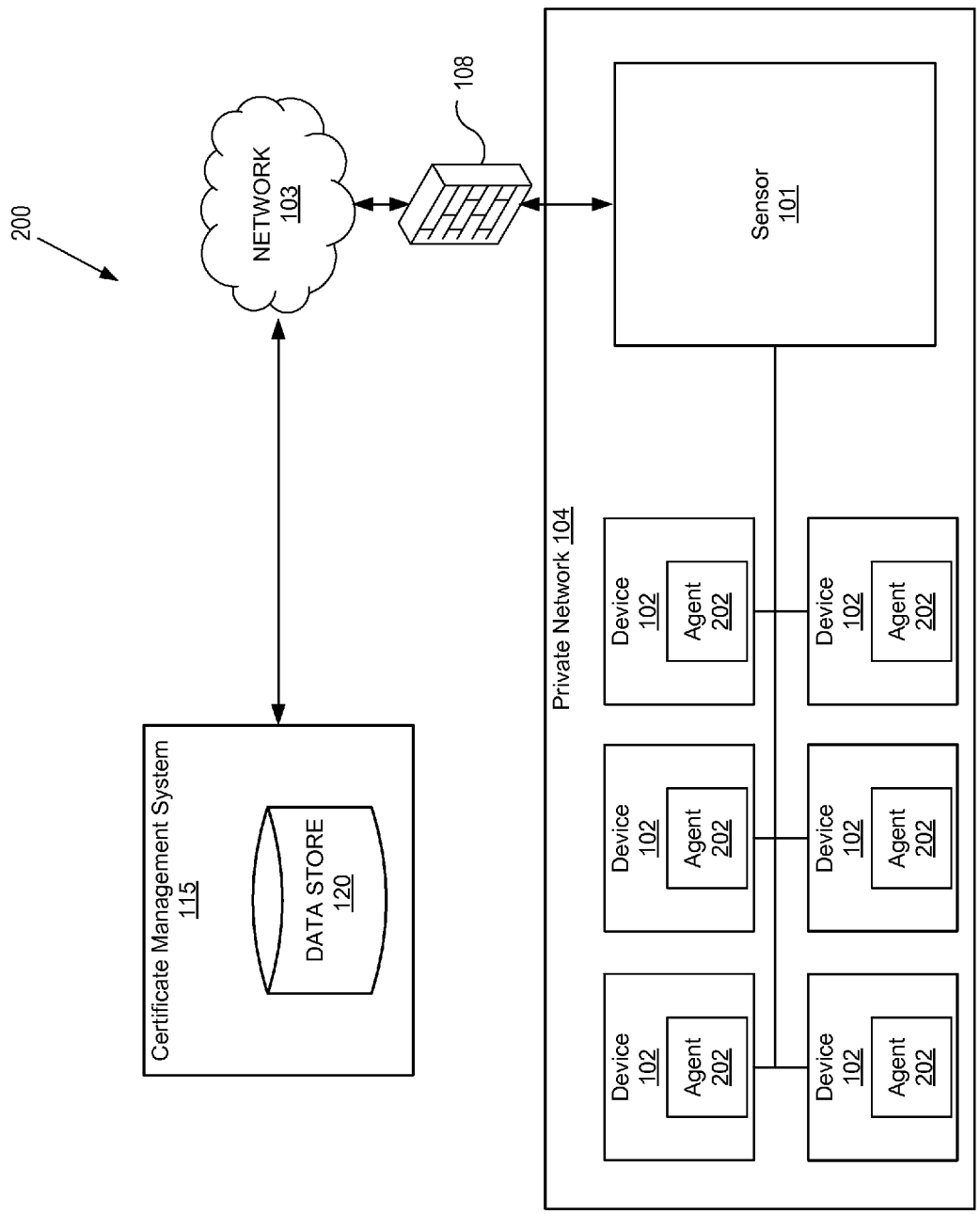
FIG. 2 is a block diagram of one embodiment of a network architecture in which embodiments of the sensor may operate.

FIG. 2 is a block diagram of one embodiment of a network architecture 200 in which embodiments of the sensor 101 may operate. In the depicted embodiment, the sensor 101 is configured to communicate with an agent 202 operating within each computing device 102. Each agent 202 is configured to communicate with the sensor 101 via the private network 104, or in an alternative embodiment, directly with the CMS 115 over the network 103.

The agents 202, in one embodiment, may act as an extension of the sensor 101 to perform the operations described above with reference to FIG. 1. In particular, the agents 202 may be configured to determine the application identity of applications operating on each computing device 102, generate CSRs, and install renewed or new certificates based on instructions from the CMS 115. In other words, in the depicted embodiment, the sensor 101 does not need remote login credentials because the agents 202 enable the execution of instructions from the sensor 101 (via the CMS 115).

It should be noted that the CMS 115 may include other components for monitoring deployed certificates and automatically generating instructions for installing or renewing certificates. Details regarding these other components have not been included to not obscure the description of the present embodiments. Further operations of the sensor 101 and the CMS 115 are described below with respect to FIGS. 3-5.

Figure 3:
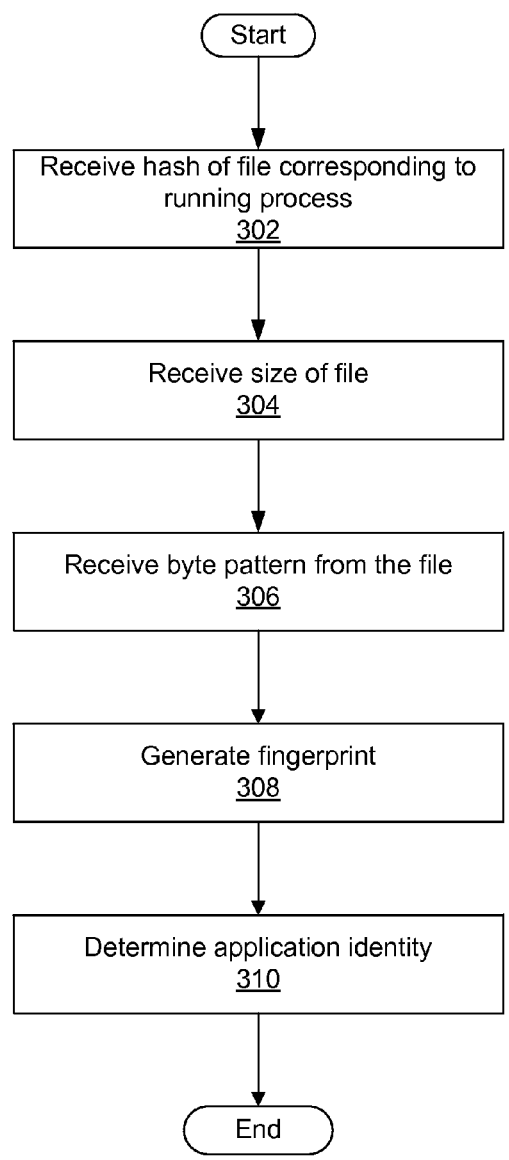
FIG. 3 is a flow diagram of one embodiment of a method of identifying an application.

FIG. 3 is a flow diagram of one embodiment of a method 300 of identifying an application. The method 300 is performed by processing logic that may comprise hardware (circuitry, dedicated logic, etc.), software (such as is run on a general-purpose computing system or a dedicated machine), or a combination of both. In one embodiment, the sensor 101 of FIG. 1 performs the method 300. In another embodiment, the agent 202 of FIG. 2 performs the method 300. Alternatively, other components of the CMS 115, computing device 102, or of both can be configured to perform some or all of the method 300.

The method 300 starts and the processing logic receives, at block 302, a hash or checksum of a file corresponding to a process associated with a detected cryptographic certificate. Cryptographic certificates may include SSL server certificates, TLS server certificates, or any combination of cryptographic certificates deployed in the network (or in another network). In one embodiment, the processing logic generates the checksum by remotely accessing the computing device associated with the certificate. In another embodiment, the processing logic receives the checksum or hash from an agent operating on the computing device.

At block 304, the processing logic receives a size of the file associated with the process. For example, if the process is httpd, the processing logic is configured to receive the size of httpd.exe on a local disk of the computing device. The processing logic, in one embodiment, issues commands from a remote session (e.g., telnet or SSH) to determine the size of the file. In another embodiment, the processing logic receives the file size from the agent operating on the computing device.

At block 306, the processing logic receives a byte pattern of the file. In one embodiment, the byte pattern may be a fixed number of bytes taken from pre-determined locations in the file. For example, the sensor 101 may extract the first 1 kB, the last 1 kB and 1 kB from the exact middle of the file. If the file is less than 3 kB, for example, the sensor 101 is configured to take the entire file and pad the rest of the pattern with zeroes to maintain consistency in the length of the byte patterns stored in the data store 120.

The processing logic next, at block 308, generates a fingerprint of the application. The fingerprint, in one example, is based on the checksum, file size, and byte pattern of the file. Alternatively, the fingerprint is based on at least one of the checksum, file size, or byte pattern. The processing logic, at block 310, compares the generated fingerprint to a database of fingerprints to determine the identity of the application. The method 300 then ends.

Figure 4:
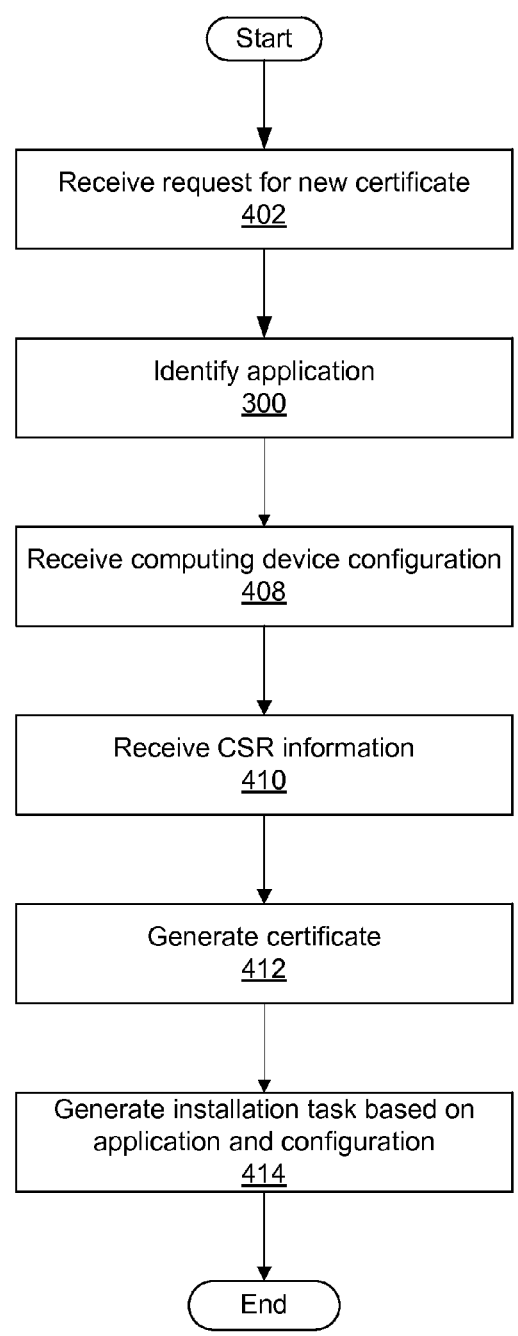
FIG. 4 is a flow diagram of one embodiment of a method of generating instructions for installing a cryptographic certificate.

FIG. 4 is a flow diagram of one embodiment of a method 400 of generating instructions for installing a cryptographic certificate. The method 400 is performed by processing logic that may comprise hardware (circuitry, dedicated logic, etc.), software (such as is run on a general-purpose computing system or a dedicated machine), or a combination of both. In one embodiment, the CMS 115 of FIG. 1 performs the method 400. In another embodiment, the sensor 101 or agent 202 of FIG. 2 performs the method 400. Alternatively, other components of the CMS 115, computing device 102, or of both can be configured to perform some or all of the method 400.

The method 400 starts and the processing logic, at block 402, receives a request for a new cryptographic certificate to be installed on a target computing device, or alternatively, multiple computing devices. In one embodiment, the processing logic receives the request via a user-interface (or console) accessible over the Internet. The processing logic may receive the request from an administrator.

The processing logic then, at block 300, identifies an application associated with the target computing device. The application, in one embodiment, is associated with secured communications over a network. The processing logic may instruct the sensor 101 or agent 202 to identify the application as described above with reference to the method 300 of FIG. 3.

The processing logic, at block 408, receives computing device configuration information. In one embodiment, the processing logic retrieves the computing device configuration information. Configuration information includes, but is not limited to, computing device operating system, web server type, port numbers, IP address, hostname, etc. At block 410 the processing logic receives CSR information. Examples of CSR information include common name, organization name, key length, etc.

At block 412, the processing logic generates a certificate based upon the CSR, and generates an installation task based upon the identified application, computing device configuration, and certificate. For example, if the processing logic determines that the computing device is running a version of Microsoft Windows Server® with a version of IIS, the processing logic generates instructions, to be executed by the sensor 101 or the agent 202, specific to the version of IIS identified. The processing logic transmits the instructions to the sensor or the agent, and the method 400 ends.

Figure 5:
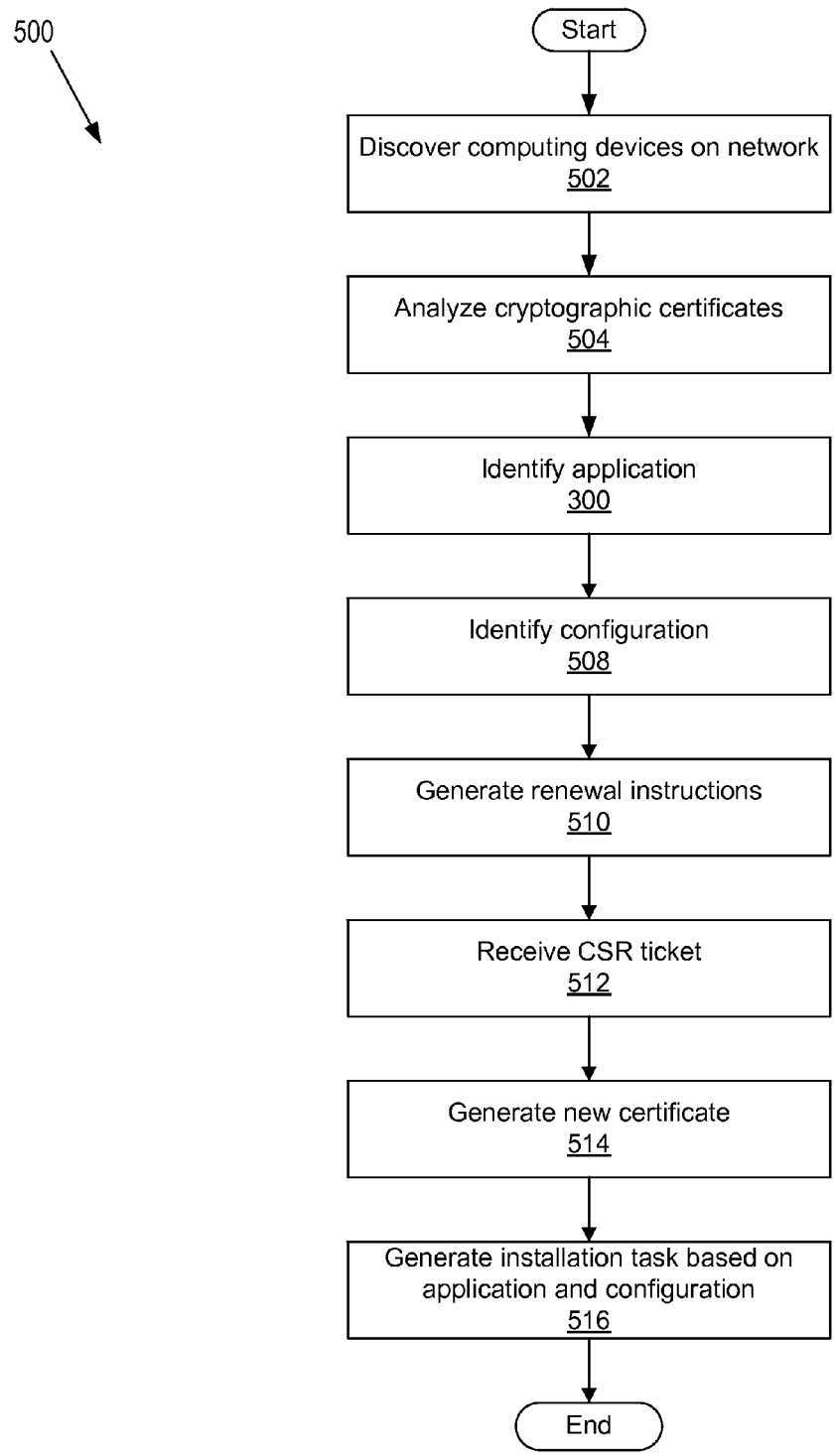
FIG. 5 is a flow diagram of one embodiment of a method of generating instructions for renewing a cryptographic certificate.

FIG. 5 is a flow diagram of one embodiment of a method 500 of generating instructions for renewing a cryptographic certificate. The method 500 is performed by processing logic that may comprise hardware (circuitry, dedicated logic, etc.), software (such as is run on a general-purpose computing system or a dedicated machine), or a combination of both. In one embodiment, the CMS 115 of FIG. 1 performs the method 500. In another embodiment, the sensor 101 or agent 202 of FIG. 2 performs the method 500. Alternatively, other components of the CMS 115, computing device 102, or of both can be configured to perform some or all of the method 500.

The method 500 starts and the processing logic, at block 502, initializes information regarding computing devices on the network. In one embodiment, the processing logic initializes information regarding computing devices on the network by instructing the sensor to scan the private network for computing devices 102 that contain cryptographic certificates, such as SSL certificates for securing network traffic. The processing logic collects information including, but not limited to, the number and type of computing devices 102, the certificates on each of the computing devices 102, and expiration dates of each of those certificates.

At block 504, the processing logic analyzes the cryptographic certificates to determine certificate chains, expiration dates, etc. The processing logic, at block 300, then identifies an application associated with the target computing device. The application, in one embodiment, is associated with secured communications over a network. The processing logic may instruct the sensor 101 or agent 202 to identify the application as described above with reference to the method 300 of FIG. 3.

The processing logic, at block 508, receives computing device configuration information. In one embodiment, the processing logic retrieves the computing device configuration information. Configuration information includes, but is not limited to, computing device operating system, web server type, port numbers, IP address, hostname, etc.

In one embodiment, the processing logic identifies that a certificate is about to expire, and the processing logic, at block 510, generates renewal instructions. The renewal instructions are received by the sensor 101 and executed to begin the certificate renewal process on a target computing device. The processing logic receives a CSR ticket, at block 512. Examples of CSR information include common name, organization name, key length, etc.

At block 514, the processing logic generates a certificate based upon the CSR, and generates an installation task (block 516) based upon the identified application, computing device configuration, and certificate. For example, if the processing logic determines that the computing device is running a version of Microsoft Windows Server® with a version of IIS, the processing logic generates instructions, to be executed by the sensor 101 or the agent 202, specific to the version of IIS identified. The processing logic transmits the instructions to the sensor or the agent, and the method 500 ends.

Figure 6:
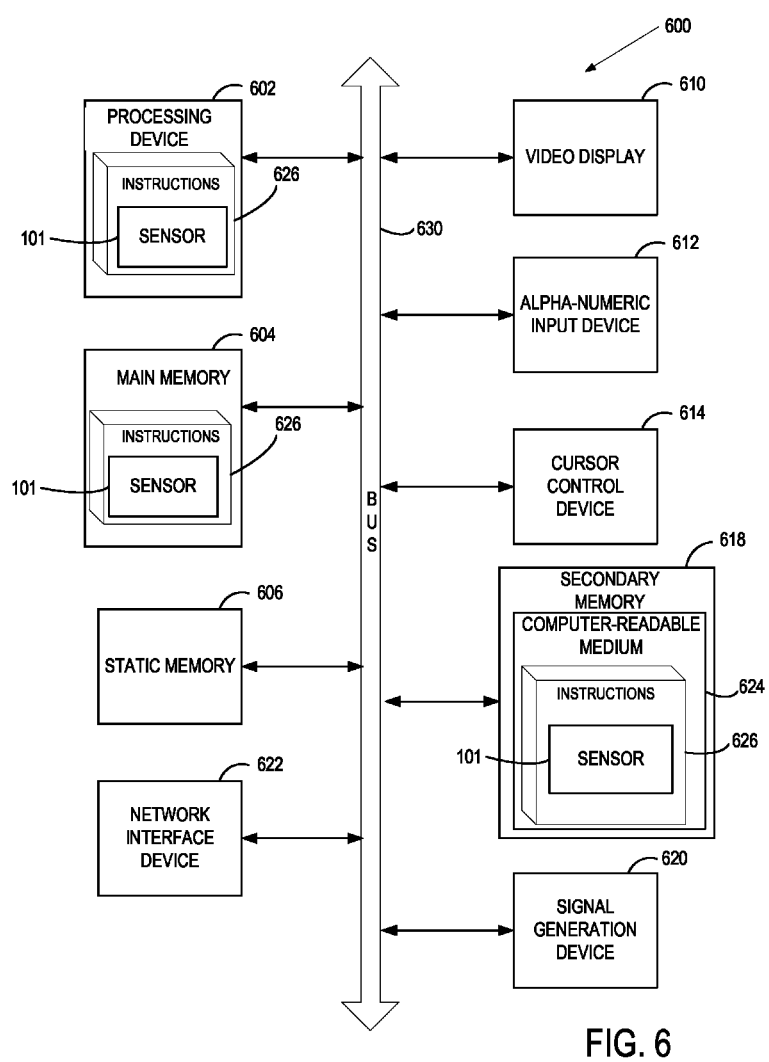
FIG. 6 is a diagram of one embodiment of a computer system for facilitating the execution of the sensor.

FIG. 6 is a diagram of one embodiment of a computer system for facilitating the execution of the sensor 101. Within the computer system 600 is a set of instructions for causing the machine to perform any one or more of the methodologies discussed herein. In alternative embodiments, the machine may be connected (e.g., networked) to other machines in a LAN, an intranet, an extranet, or the Internet. The machine can be a host in a cloud, a cloud provider system, a cloud controller or any other machine. The machine can operate in the capacity of a server or a client machine in a client-server network environment, or as a peer machine in a peer-to-peer (or distributed) network environment. The machine may be a personal computer (PC), a tablet PC, a console device or set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines (e.g., computers) that individually or jointly execute a set (or multiple sets) of instructions to perform any one or more of the methodologies discussed herein.

The exemplary computer system 600 includes a processing device 602, a main memory 604 (e.g., read-only memory (ROM), flash memory, dynamic random access memory (DRAM) such as synchronous DRAM (SDRAM) or DRAM (RDRAM), etc.), a static memory 606 (e.g., flash memory, static random access memory (SRAM), etc.), and a secondary memory 618 (e.g., a data storage device in the form of a drive unit, which may include fixed or removable computer-readable storage medium), which communicate with each other via a bus 630.

Processing device 602 represents one or more general-purpose processing devices such as a microprocessor, central processing unit, or the like. More particularly, the processing device 602 may be a complex instruction set computing (CISC) microprocessor, reduced instruction set computing (RISC) microprocessor, very long instruction word (VLIW) microprocessor, processor implementing other instruction sets, or processors implementing a combination of instruction sets. Processing device 602 may also be one or more special-purpose processing devices such as an application specific integrated circuit (ASIC), a field programmable gate array (FPGA), a digital signal processor (DSP), network processor, or the like. Processing device 602 is configured to execute the instructions 626 for performing the operations and steps discussed herein.

The computer system 600 may further include a network interface device 622. The computer system 600 also may include a video display unit 610 (e.g., a liquid crystal display (LCD) or a cathode ray tube (CRT)) connected to the computer system through a graphics port and graphics chipset, an alphanumeric input device 612 (e.g., a keyboard), a cursor control device 614 (e.g., a mouse), and a signal generation device 620 (e.g., a speaker).

The secondary memory 618 may include a machine-readable storage medium (or more specifically a computer-readable storage medium) 624 on which is stored one or more sets of instructions 626 embodying any one or more of the methodologies or functions described herein. In one embodiment, the instructions 626 include instructions for the sensor 101. The instructions 626 may also reside, completely or at least partially, within the main memory 604 and/or within the processing device 602 during execution thereof by the computer system 600, the main memory 604 and the processing device 602 also constituting machine-readable storage media.

The computer-readable storage medium 624 may also be used to store the instructions 626 persistently. While the computer-readable storage medium 624 is shown in an exemplary embodiment to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing or encoding a set of instructions for execution by the machine and that cause the machine to perform any one or more of the methodologies of the present invention. The term "computer-readable storage medium" shall accordingly be taken to include, but not be limited to, solid-state memories, and optical and magnetic media.

The instructions 626, components and other features described herein can be implemented as discrete hardware components or integrated in the functionality of hardware components such as ASICS, FPGAs, DSPs or similar devices. In addition, the instructions 626 can be implemented as firmware or functional circuitry within hardware devices. Further, the instructions 626 can be implemented in any combination hardware devices and software components.

The CMS 115, sensor 101, components, and other features described herein (for example in relation to FIGS. 1-2) can be implemented as discrete hardware components or integrated in the functionality of hardware components such as ASICS, FPGAs, DSPs, or similar devices. The CMS 115 and sensor 101 may implement operations of automated certificate configuring and provisioning as described herein with respect to FIGS. 3-5.

The embodiments described herein are directed to the automatic generation of SSL server certificates. The embodiments described herein may be used in connection with a CMS, such as the Symantec® CIC or other types of certificate systems. Some conventional CMS may have the ability to manually generate SSL server certificates. However, creating these certificates is a manual task and many users may end up with a trial-and-error method of figuring out what parameters to include in the certificate. Even after the trial-and-error based creation of the certificate, there still is a chance that some important parameter has been missed. Using the embodiments described herein, instead of asking the user to figure out the installation of certificates, the CMS 115 and sensor 101 may install and configure SSL certificates.

In the above description, well-known structures and devices are shown in block diagram form, rather than in detail, in order to avoid obscuring the present invention. Some portions of the description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "receiving", "storing", "monitoring", "creating", "generating", "sending", "intercepting," "capturing," "mapping", "generating," or the like, refer to the actions and processes of a computing system, or similar electronic computing system that manipulates and transforms data represented as physical (e.g., electronic) quantities within the computing system's registers and memories into other data similarly represented as physical quantities within the computing system's memories or registers or other such information storage, transmission or display devices.

Embodiments of the present invention also relate to an apparatus for performing the operations herein. This apparatus may be specially constructed for the required purposes, or it may comprise a general-purpose computer selectively activated or reconfigured by a computer program stored in the computer. As discussed above, such a computer program may be stored in a computer readable medium.

The algorithms and displays presented herein are not inherently related to any particular computer or other apparatus. Various general-purpose systems may be used with programs in accordance with the teachings herein, or it may prove convenient to construct a more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

It is to be understood that the above description is intended to be illustrative, and not restrictive. Many other embodiments will be apparent to those of skill in the art upon reading and understanding the above description. The scope of the invention should, therefore, be determined with reference to the appended claims, along with the full scope of equivalents to which such claims are entitled.

What is claimed is:

1. A method comprising:
   receiving, by a certificate management sensor executing on a processor of a first computing device, first instructions from a certificate management system (CMS) over a first network to analyze a second computing device on a second network to identify an application on the second computing device associated with cryptographic network traffic on the second computing device;
   determining, by the certificate management sensor, an application identity of the application operating on the second computing device that uses a cryptographic certificate in response to the first instructions, wherein the application identity comprises an application name, an application version and an operating system identifier;
   generating, by the certificate management sensor, an application fingerprint of the application, wherein generating the application fingerprint comprises determining a checksum of a file on disk that corresponds to the application using the cryptographic certificate, a size of the file, and a byte pattern from the file;
   transmitting, by the certificate management sensor, the application fingerprint to the CMS in response to the first instructions;
   receiving, by the certificate management sensor, second instructions from the CMS to generate a certificate signing request (CSR) for a new, renewed or replacement certificate for the application, wherein the second instructions are generated by the CMS based on the application fingerprint received from the certificate management sensor;
   generating, by the certificate management sensor, the CSR for the new, renewed or replacement certificate for the application in response to the second instructions;
   transmitting, by the certificate management sensor, the CSR to the CMS over the first network in response to the second instructions;
   receiving, by the certificate management sensor, third instructions from the CMS to automatically install the new, renewed or replacement certificate on the second computing device in response to the CSR; and
   initiating execution of the third instructions to automatically install the new, renewed or replacement certificate on the second computing system.

2. The method of claim 1, wherein the cryptographic certificate comprises one of a Secure Socket Layer (SSL) server certificate or a Transport Layer Security (TLS) server certificate.

3. The method of claim 1, wherein the initiating execution of the third instructions comprises:
   accessing, by the certificate management sensor, the second computing system over the second network via a remote session; and
   executing the third instructions to automatically install new, renewed or replacement certificate on the second computing device via the remote session.

4. The method of claim 1, wherein the initiating execution of the third instructions comprises instructing an agent operating on the second computing device to install the cryptographic certificate according to the third instructions.

5. The method of claim 1, wherein the byte pattern comprises a fixed number of bytes extracted from the file from at least one of a first 1 kB, a last 1 kB, or a middle 1 kB of the file.

6. The method of claim 1, wherein the first instructions to analyze the second computing device further comprise directions to identify a configuration of the second computing device, the configuration comprising at least one of an operating system, an IP address, a port used by the cryptographic network traffic, an expiration date of the cryptographic certificate, a signature algorithm information, key length information, or certificate issuer information.

7. A computing system, comprising:
   a memory; and
   a processor coupled with the memory to execute a certificate management sensor configured to:
      receive first instructions from a certificate management system (CMS) over a first network to analyze a second computing device on a second network to identify an application on the second computing device associated with cryptographic network traffic on the second computing device;
      determine an application identity of an application operating on the second computing device that uses a cryptographic certificate in response to the first instructions, wherein the application identity comprises an application name, an application version and an operating system identifier;
      generate an application fingerprint of the application, wherein certificate management sensor is to determine a checksum of a file on disk that corresponds to the application using the cryptographic certificate, a size of the file, and a byte pattern from the file;
      transmit the application fingerprint to the CMS in response to the first instructions;
      receive second instructions from the CMS to generate a certificate signing request (CSR) for a new, renewed or replacement certificate for the application, wherein the second instructions are generated by the CMS based on the application fingerprint received from the certificate management sensor;
      generate the CSR for the new, renewed or replacement certificate for the application in response to the second instructions;
      transmit the CSR to the CMS over the first network in response to the second instructions;
      receive third instructions from the CMS to automatically install the new, renewed or replacement certificate on the second computing device in response to the CSR; and
      initiate execution of the third instructions to automatically install the new, renewed or replacement certificate on the second computing system.

8. The computing system of claim 7, wherein the cryptographic certificate comprises one of a Secure Socket Layer (SSL) server certificate or a Transport Layer Security (TLS) server certificate.

9. The computing system of claim 7, wherein the certificate management sensor is further configured to access the second computing system over the second network via a remote session and execute the third instructions to automatically install the new, renewed or replacement certificate on the second computing device via the remote session.

10. The computing system of claim 7, wherein the certificate management sensor is further configured to instruct an agent operating on the computing device to install the cryptographic certificate according to the third instructions.

11. The computing system of claim 7, wherein the byte pattern comprises a fixed number of bytes extracted from the file from at least one of a first 1 kB, a last 1 kB, or a middle 1 kB of the file.

12. The computing system of claim 7, wherein the first instructions to analyze the second computing device further comprise directions to identify a configuration of the second computing device, the configuration comprising at least one of an operating system, an IP address, a port used by the cryptographic network traffic, an expiration date of the cryptographic certificate, a signature algorithm information, key length information, or certificate issuer information.

13. A non-transitory computer readable storage medium including instructions that, when executed by a processor, cause the processor to perform operations comprising:

receiving, from a certificate management sensor executing on a first computing device, first instructions from a certificate management system (CMS) over a first network to analyze a second computing device on a second network to identify an application on the second computing device associated with cryptographic network traffic on the second computing device;

determining, by the certificate management sensor, an application identity of an application operating on the second computing device that uses a cryptographic certificate in response to the first instructions, wherein the application identity comprises an application name, an application version and an operating system identifier;

generating, by the certificate management sensor, an application fingerprint of the application, wherein generating the application fingerprint comprises determining a checksum of a file on disk that corresponds to the application using the cryptographic certificate, a size of the file, and a byte pattern from the file;

transmitting, by the certificate management sensor, the application fingerprint to the CMS in response to the first instructions;

receiving, by the certificate management sensor, second instructions from the CMS to generate a certificate signing request (CSR) for a new, renewed or replacement certificate for the application, wherein the second instructions are generated by the CMS based on the application fingerprint received from the certificate management sensor;

generating, by the certificate management sensor, the CSR for the new, renewed or replacement certificate for the application in response to the second instructions;

transmitting, by the certificate management sensor, the CSR to the CMS over the first network in response to the second instructions;

receiving, by the certificate management sensor, third instructions from the CMS to automatically install the new, renewed or replacement certificate on the second computing device in response to the CSR; and initiating execution of the third instructions to automatically install the new, renewed or replacement certificate on the second computing system.

14. The non-transitory computer readable storage medium of claim 13, wherein the initiating execution of the third instructions comprises:

accessing, by the certificate management sensor, the second computing system over the second network via a remote session; and executing the third instructions to automatically install new, renewed or replacement certificate on the second computing device via the remote session.

15. The non-transitory computer readable storage medium of claim 13, wherein the initiating execution of the third instructions comprises instructing an agent operating on the second computing device to install the cryptographic certificate according to the third instructions.

16. The non-transitory computer readable storage medium of claim 13, wherein the byte pattern comprises a fixed number of bytes extracted from the file from at least one of a first 1 kB, a last 1 kB, or a middle 1 kB of the file.

17. The non-transitory computer readable storage medium of claim 13, wherein the first instructions to analyze the second computing device further comprise directions to identify a configuration of the second computing device, the configuration comprising at least one of an operating system, an IP address, a port used by the cryptographic network traffic, an expiration date of the cryptographic certificate, a signature algorithm information, key length information, or certificate issuer information.

* * * * *